(12) United States Patent
Leonard

(10) Patent No.: US 6,571,733 B2
(45) Date of Patent: Jun. 3, 2003

(54) BIRD FEEDER WITH NON-STICK REMOVABLE BOTTOM SCREEN

(76) Inventor: Jeffrey L. Leonard, 8025 Penny Rd., Pleasant Hill, OH (US) 45359

(*) Notice: Subject to any disclaimer, the term of this patent is extended or adjusted under 35 U.S.C. 154(b) by 0 days.

(21) Appl. No.: 09/951,317

(22) Filed: Sep. 14, 2001

(65) Prior Publication Data
US 2003/0051671 A1 Mar. 20, 2003

(51) Int. Cl.[7] .............................................. A01K 61/02
(52) U.S. Cl. ..................................................... 119/52.2
(58) Field of Search ............................. 119/52.2, 52.1, 119/52.4, 53, 57.8, 57.91, 58, 429, 432, 462, 463

(56) References Cited

U.S. PATENT DOCUMENTS

| | | | | |
|---|---|---|---|---|
| 3,100,474 A | * | 8/1963 | Schneider | 119/166 |
| 3,151,600 A | * | 10/1964 | Crouch et al. | 119/57.8 |
| 3,650,592 A | * | 3/1972 | Williams | 312/348.1 |
| 4,167,917 A | * | 9/1979 | Noll | 119/429 |
| 4,425,873 A | * | 1/1984 | Rinne, Jr. | 119/53 |
| 4,586,463 A | * | 5/1986 | Braeuner | 119/462 |
| 5,152,247 A | * | 10/1992 | Brown | 119/464 |
| 5,479,880 A | * | 1/1996 | Stuhr et al. | 119/57.8 |
| 5,758,596 A | * | 6/1998 | Loiselle | 119/52.2 |
| 5,894,813 A | * | 4/1999 | George | 119/57.9 |
| 5,924,381 A | * | 7/1999 | Bloedorn | 119/52.2 |
| 5,957,087 A | * | 9/1999 | Bonder et al. | 119/429 |
| 6,321,686 B2 | * | 11/2001 | Geis et al. | 119/429 |
| 6,450,120 B1 | * | 9/2002 | Nylen | 119/52.2 |

* cited by examiner

Primary Examiner—Charles T. Jordan
Assistant Examiner—Kimberly S. Smith
(74) Attorney, Agent, or Firm—William Weigl

(57) ABSTRACT

A bird feeder is provided with a metallic perforate trough bottom that is supported on its underside on ledges consisting of a plastic material on which water tends to bead rather than sheet, and which material is essentially self-lubricating and thereby non-caking and non-sticking. In its preferred form, the bottom is a screen that is slidable horizontally on the ledges. Preferably, the material is ultra-violet ray resistant and is therefore capable of long life in the outdoors, maintaining its desired characteristics for a considerable period. The end goal is to provide easy and quick feeder cleaning capabilities, especially in sub-freezing temperatures. The design prevents moisture-absorbent wooden elements of the feeder from coming into contact with screen.

16 Claims, 3 Drawing Sheets

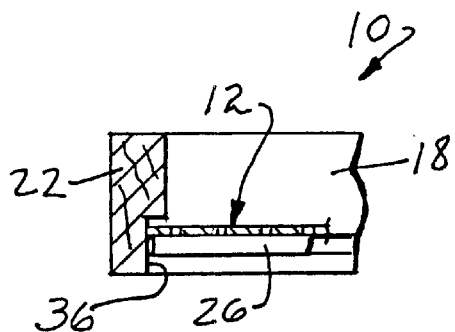
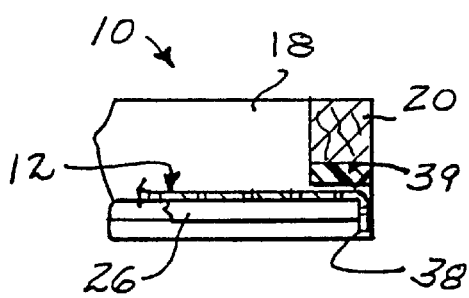
FIG. 3    FIG. 4
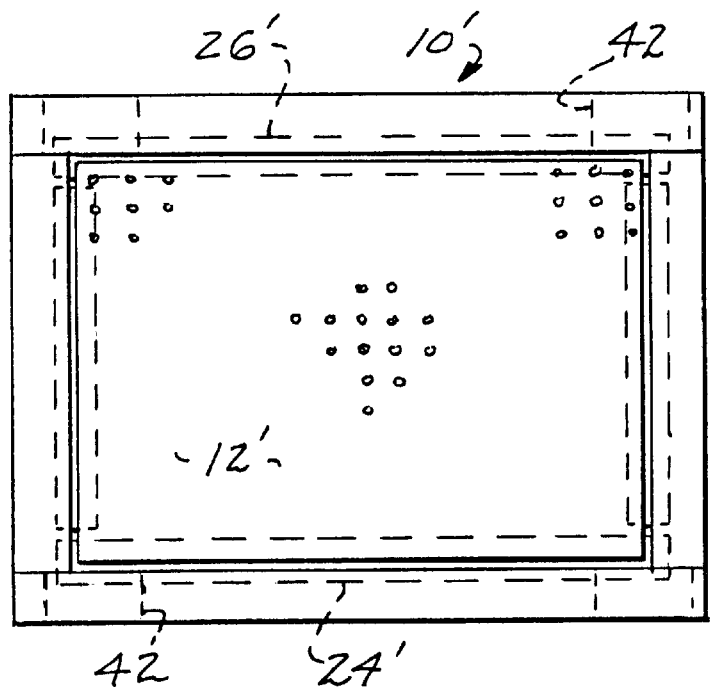
FIG. 5
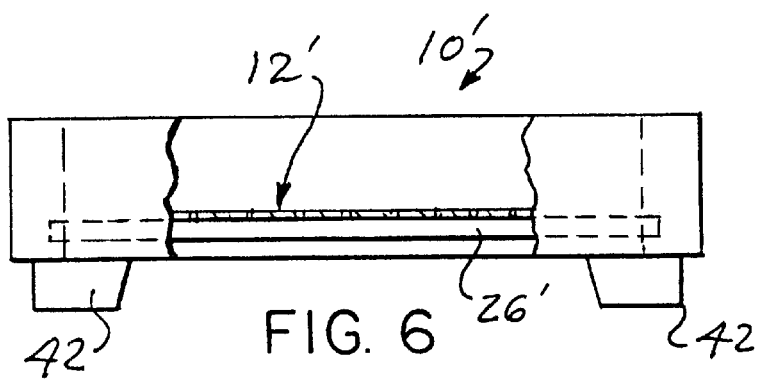
FIG. 6

BIRD FEEDER WITH NON-STICK REMOVABLE BOTTOM SCREEN

This invention relates generally to bird feeders, and in particular to such a feeder in which the bottom of its feed-containing trough has a water pervious screen that may be removed for cleaning in sub-freezing temperatures.

BACKGROUND OF THE INVENTION

For a number of years, the troughs of bird feeders have been provided with screens to enable drainage of rainwater or melted snow therethrough, to keep the feed dry. Prior to that, feed and shucks of seed such as sunflower would accumulate and cake, and, especially if the temperature were below freezing, would freeze into hard-to-remove clumps. Cleaning was difficult, but had to be done in order for fresh seed to move downwardly by gravity from the conventional hopper into the trough. In addition, bird excrement would sometimes accumulate with the seed residue and would place birds at risk from spread of disease. Their excrement sometimes also acted as a binding agent, effectively gluing the expended seed remains to the bottom. This made cleaning somewhat difficult, even in temperatures above freezing.

Once the bird feeder industry went in fairly large measure with drainable bottom screens, liquid would pass through a perforated bottom, but the residue would still continue to pile up. Frozen clumping was not nearly as much of a problem because of water passing through the screen, but remained still. This required feeders to be removed and inverted for cleaning, until designs appeared in which the bottom screens were made to be horizontally slidable, much like the slide of a drawer. This was a valuable improvement in the art since the feeder did not then have to be removed from its post or chain. However, the manner in which the sliding bottom screen was supported, typically in grooves in the wooden sides of the trough, created a new problem when feeding birds in cold climates during winter. That is the period when bird feeding is most essential to preserve wildlife, since birds have difficulty getting food without the help of humans during winter. And if the wood from which the feeder is typically made expands from moisture at the same time seed residues tend to cake in the screen grooves and on the bottom of the trough, removing the slidable screen becomes difficult in some instances, near impossible in others. Obviously, the longer the period between cleanings of the trough because of freezing conditions, the more susceptible the birds will become to disease being spread from one bird to another and from one species to another. The need remained for enabling a screen to be removed easily and rapidly for cleaning a feeder in freezing temperatures.

SUMMARY OF THE INVENTION

A bird feeder is provided with a metallic perforate trough bottom that is supported on its underside on ledges consisting of a plastic material on which water tends to bead rather than sheet, and which plastic material is essentially self-lubricating and thereby non-caking and non-sticking. Preferably, the material is also ultra-violet ray resistant and is therefore capable of long life in the outdoors, maintaining its other desired characteristics for a considerable period. The end goal is to provide easy and quick feeder cleaning capabilities, especially in sub-freezing temperatures.

A principal object of the invention is to provide a bottom screen for a bird feeder trough, which screen is supported in a manner making it capable of easy and quick removal and reinstallation, particularly in freezing temperatures.

A further object is to provide a removable metal screen at the bottom of a bird feeder trough, and to support that screen solely on plastic ledges having a slick surface on which water only tends to bead.

An ancillary object is to support such a metal screen in a manner that it does not come into contact with moisture absorbent wooden portions of the structure.

More specifically, an object is to provide ledges for the screen, which ledges are made from a plastic material that is impervious to water, and which ledges have self-lubricating and non-caking characteristics.

Still more specifically, an object is to provide ledges that are made of an ultra-high molecular weight polyethylene that is preferably resistant to the rays of ultra-violet light.

Other objects will become apparent from the following description, in which reference is made to the accompanying drawings.

BRIEF DESCRIPTION OF THE DRAWINGS

FIG. 3 is a fragmentary cross-sectional view taken along lines 3—3 of FIG. 1.

FIG. 4 is a fragmentary cross-sectional view taken along lines 4—4 of FIG. 1.

FIGS. 5 and 6 are top and side views respectively of a ground-type feeder incorporating the novel screen supports, but enabling its removal by either inverting the trough or lifting the screen from below.

DESCRIPTION OF THE PREFERRED EMBODIMENTS

Figure 1:
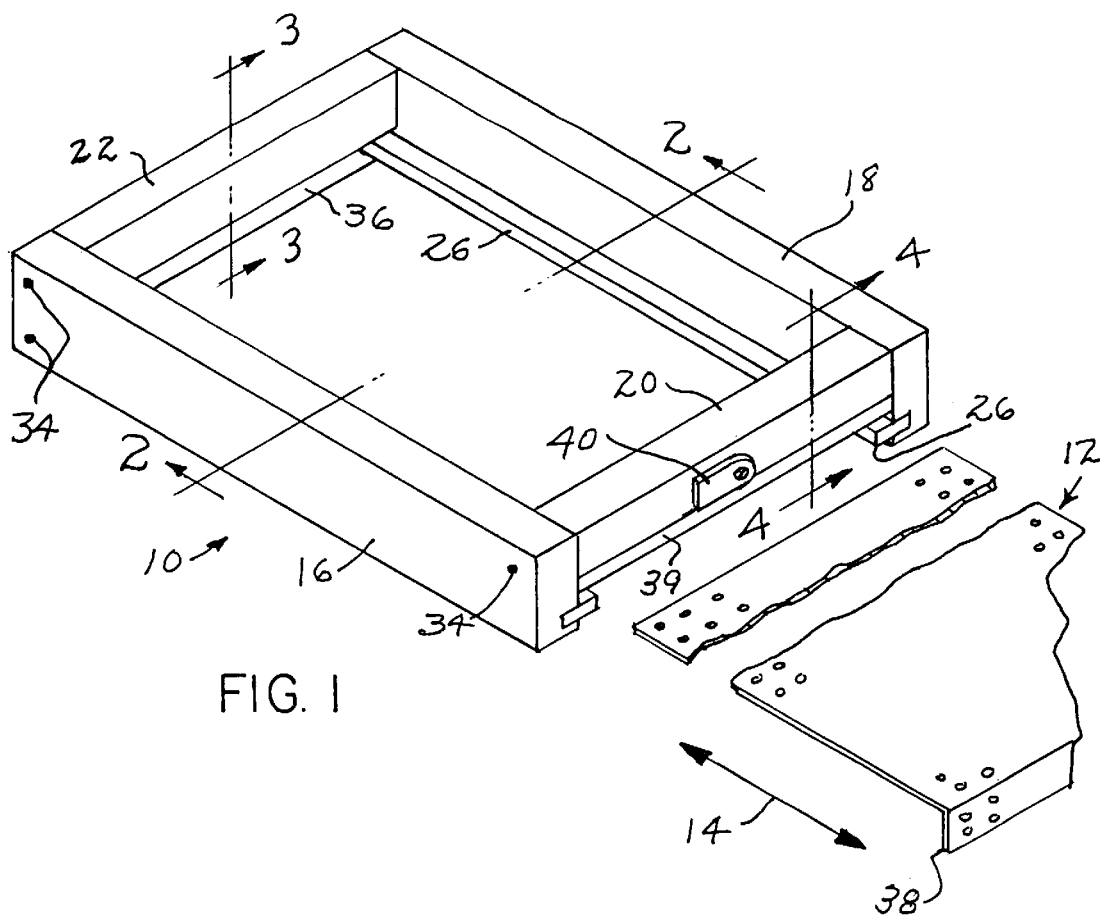
FIG. 1 is an isometric exploded view of a bird feeder trough that may be part of either an off-the-ground or ground feeder.

FIG. 1 illustrates a trough 10 and a metal screen 12 that is slidable horizontally in opposite directions as indicated by the arrow 14 between a seed-supporting position within the confines of the trough 10 and a remote position shown in full lines at the exterior of the trough. When within the trough, the screen 12 will support seeds between the inner vertical surfaces of side walls 16 and 18 and end walls 20 and 22. The terms side walls and end walls are used herein for convenience of description and claiming, it being understood that all four walls should be considered side walls, whether extending along the length or width of a rectangular or square trough. The tops of the side walls typically present a perch for birds to stand during feeding, but smaller birds frequently stand directly on the feed and feed residues lying in the trough. The screen 12 has a pattern of holes which are suitable for adequate draining of water or melted snow, and the holes will be of dimensions enabling whatever kind of feed that is being supplied to keep from passing through the screen. While I prefer using a heavy gauge aluminum screen to provide sufficient rigidity to support both seed and birds, any kind of screen can be used, including plastic, expanded metal, etc. The particular screen I find useful is approximately $\frac{1}{16}^{th}$ of an inch thick, has $\frac{1}{16}^{th}$ of an inch diameter holes and has spacing between holes of approximately $\frac{1}{8}^{th}$ of an inch. Any configuration and size of openings may be used according to the feed material offered to the birds or other animals.

A key feature of my invention relates to the manner in which I support the screen 12 within the trough 10 so that the screen can become effectively non-sticking when it comes to its having to be removed for cleaning during freezing temperatures. To achieve this end, I provide special material ledges 24 and 26 on which the screen 12 rests when in seed-supporting position within the trough 10. Those ledges are preferably a high molecular weight polyethylene of the type designated UHMW-PE produced by Crown Plastics of Harrison, Ohio. The material is said by its manufacturer to have characteristics of outstanding impact strength at even very low temperatures, a low coefficient of friction, self-lubricating capabilities (non-caking and sticking) and is FDA and USDA approved. In addition, it is capable of being produced in ultra-violet light resistant form, extending its life in the outdoors for a considerable period. It also has stress cracking resistance, making it useful in the narrow strip form illustrated for the ledges 24 and 26. It has a molecular weight average ten times that of conventional high density polyethylene resins.

Figure 2:
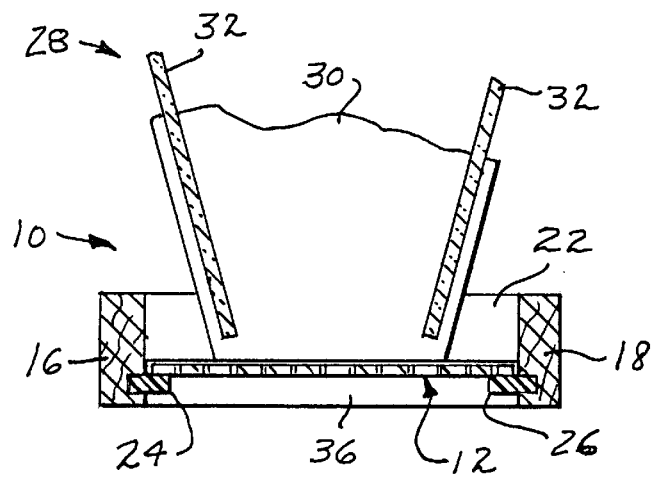
FIG. 2 is a fragmentary view taken along lines 2—2 of FIG. 1, illustrating the trough in cross-section taken essentially along lines 2—2 of FIG. 1, as part of a hopper-type feeder which may be either suspended from chains or supported on a pole.

In FIG. 2, I illustrate the trough 10 and screen 12 being used in conjunction with a superstructure 28 in the form of wooden ends 30 (only one of which is shown) and a pair of transparent hopper sides 32 which conventionally are vertically insertable from above into grooves formed in the wooden ends 30. The ends 30 and sides 32 form a hopper for containing seed therebetween. Since the hopper, the manner of placing the feed into the hopper and the manner of either suspending the feeder from chains or mounting it on a post are not a part of the novel aspect of my preferred form of the invention of FIGS. 1–4, let it suffice to say they can be any of several different structural designs.

The side and ends walls 16, 18, 20 and 22 and the ends 30 of the hopper are all constructed of appropriate exterior-type wood, ideally being cedar for its well-known long life characteristic. The manner in which the separate wooden elements may be interconnected is preferably through use of rust-resistant screws at points 34, but the fasteners may be of any suitable type provided they form a firm feeder structure. As seen in FIG. 1, the side walls 16 and 18 are grooved with a saw kerf for their full lengths to receive the strip ledges 24 and 26. The inner edges of the ledges may extend inwardly of the inner surfaces of the side walls approximately $\frac{1}{4}^{th}$ of an inch to support the screen 12. Once in place, the ledges, which are only $\frac{1}{8}^{th}$ of an inch in thickness, may be easily stapled upwardly from the undersides at an angle in one or more locations where the ledges enter the grooves. Depending on the size of the feeder, two-side edge support of the screen may be sufficient by itself. If however, the trough is of such large horizontal dimensions that additional screen support is desired, the screen can either be made of thicker material or additional ledges can be provided for the screen at one or both of the end walls 20 and 22. For example, end wall 22 may be grooved similarly to side walls 16 and 18 and an additional ledge provided between the inner edges of ledges 24 and 26 as seen in FIG. 2.

Cross-referring to both FIGS. 2 and 3, it will be seen that the lower inner side of end wall 22 is notched inwardly at 36. This allows both the screen 12 and ledge 26 to extend somewhat into the notch and prevent seed from escaping at that location. Obviously, if an additional ledge were provided in end wall 22, the notch 36 would not be necessary.

In FIG. 4, the screen 12 is resting on the ledges 24 and 26 and is shown as having a depending lip 38 that is preferably integral with the screen 12 by being bent downwardly therefrom. The lip 38 contacts the rightward ends of the ledges 24 and 26 when the screen 12 is filly inserted as shown in both FIGS. 3 and 4. Immediately above the lip 38, a strip 39 of the UHMW-PE material may also be stapled to the underside of end wall 20 to assist guiding the screen 12 into place when being returned to the trough after cleaning. To enhance the guiding, the lower outside corner of the strip 39 may be beveled or rounded off. The strip 39 also prevents moisture absorbed by the wooden end wall 20 from coming into contact with the top surface of the screen and causing sticking in cold weather. A retaining latch 40, shown only in FIG. 1, can be moved from a non-retaining position shown in solid lines in FIG. 1 by pivoting it about a screw to cause it to extend downwardly and prevent the screen lip and screen from moving to the right in FIG. 4 once it has been installed.

FIGS. 5 and 6 illustrate another type of feeder which can stand on legs 42 directly on the ground or some other flat surface. Alternatively, the feeder of FIGS. 5 and 6 may be mounted on a tree or suspended at its corners from chains. With such a feeder, slidability of the screen 12' as illustrated in the preferred form of the invention is unnecessary, since there is no superstructure such as a hopper above the trough. For cleaning the trough, the feeder may simply be turned over to remove the screen and residue, or the screen can be pushed upwardly from below. For this reason, at least two opposing side walls of the trough should be grooved for reception of ledges similar to those in the earlier embodiment. Or, in anticipation of heavier wildlife such as squirrels also feeding from the trough, ledges can be provided on all four walls of the trough 10' as shown in these Figures. As a result of the fact that the ledges are made of a plastic material on which water only beads instead of sheets, the screen 12' is easily and quickly removable for cleaning during freezing temperatures.

Figure 7:
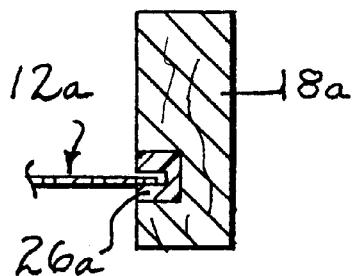
FIGS. 7–12 illustrate several alternative designs of ledges for supporting the screen.
Figure 8:
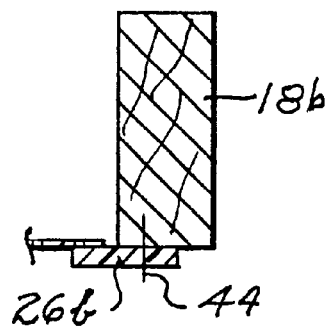
Figure 9:
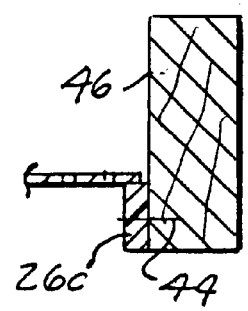
Figure 10:
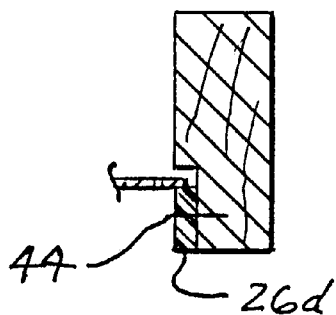
Figure 11:
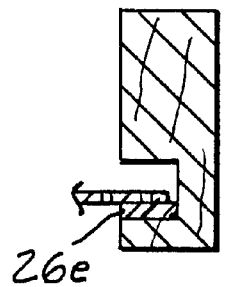
Figure 12:
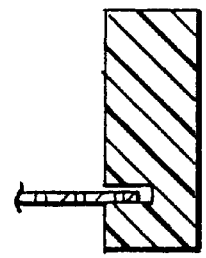

FIGS. 7–12 illustrate the very many different designs that are possible, including others not depicted here. In FIG. 7, the ledge 26a may be inset into a groove in the wooden side wall 18a, with the ledge itself being grooved to receive the screen 12a. Ledges 26a, as is also true of several of the following ledges about to be described, are secured in the grooves in one manner or another. Stapling, as illustrated at 44 in FIGS. 8–10 may also be used to secure any of the ledges in their grooves. In FIG. 8, ledge 26b may be stapled to the underside of the side wall 18b. FIG. 9 is quite similar to FIG. 8 except that the ledge 26c is attached to the inner vertical surface 46 of its side wall. FIG. 10 shows screen support similar to FIG. 9, except that the ledge 26d is inset in a notch in the side wall. FIG. 11 is somewhat like the arrangement of FIG. 7, but the ledge 26e is in the form of a flat rather than a grooved strip. FIG. 12, although not readily practical under present pricing structure for the UHMW material, illustrates that the side walls themselves can be constructed of the non-stick material, with the ledges being formed by merely grooving the side walls.

The size of the feeder and thus the trough may be of any suitable dimensions for such feeders, keeping in mind that the stiffness of the screen and the number and dimensions of the ledges on which the screen is supported should be selected in accordance with the type of birds or other wildlife normally expected to seek food at the particular feeder. The grooves which receive the ledges can be made to receive them snuggly, since expansion of the wood in which the grooves are made is of no significance, such as it would be if the grooves actually supported the edges of the screen as in prior art designs. There is little chance of any contact of any of the wooden elements of the trough or other parts of the feeder with the metal screen; consequently, freezing moisture has little opportunity to cause sticking of the screen to its support. The screen 12 it totally and completely supported on the UHMW-PE material in the FIGS. 1–4 embodiment. It can be noted that there is some slight clearance between the outer edges of the screen 12' relative to the inner surfaces of the side and end walls of the ground feeder of FIGS. 5–6 to avoid ice formation on wet wood from inhibiting removal of the screen 12'. Caking of feed residue, snow and ice can gather around the edges of the screen 12', but since there is no sliding action required for the screen as in the preferred embodiment, removal is not that difficult.

Various other changes may be made in the details of the design without departing from the spirit and scope of the claims.

Having described my invention, I claim:

1. In an outdoor bird feeder having rectangular upstanding side and end walls defining a trough for containing bird seed between inner vertical surfaces of said walls, a relatively rectangular rigid, thin flat metallic perforate bottom screen having a plurality of spaced openings of dimensions less than the seed to be contained therein but enabling liquid drainage through said openings, narrow screen-supporting ledges spaced apart a distance less than one dimension of said screen and being located adjacent the bottom of at least said side wall inner surfaces for providing sole support for said screen when positioned on the ledges to form the bottom of said trough, said metallic screen having opposed lower underside edges thereof being directly supported atop and in surface contact with said ledges, said screen further being removable solely in its plane relative to said trough by sliding on said ledges for enabling cleaning of seed residue and bird droppings therefrom, said ledges consisting of water-impervious polymeric plastic material having a self-lubricating characteristic tending to cause water droplets to bead rather than sheet thereon when wet, said self-lubricating characteristic resisting the tendency of ice to adhere to said ledges and soil to cake thereon whereby the screen may be readily and relatively easily removed in its plane from the trough when ice and/or soil exists between the underside edges of said screen and upper surfaces of said ledges at temperatures below that at which water freezes, and, wherein at least one end wall that extends across said side walls at a right angle thereto has an open area from its bottom inner edge to a level above said ledges slightly exceeding the thickness of said screen, whereby said screen may extend into and be removed horizontally from said open area along the upper surfaces of said ledges.

2. In a bird feeder according to claim 1, wherein said side walls are provided with horizontal grooves therein, and wherein said ledges are supported in said grooves.

3. In a bird feeder according to claim 1 wherein said at least one end wall that extends across said side walls has an underside surface of the same plastic material as said ledges, said underside surface and the top surface of said screen being vertically spaced a nominal distance allowing free sliding motion of said screen during its removal and reinstallation whenever said screen has ice on it top surface.

4. In a bird feeder according to claim 1 wherein said ledges comprise a polymer consisting of an ultra high molecular weight polyethylene.

5. In a bird feeder according to claim 4 wherein said ledge material is further provided with a characteristic rendering it resistant to ultra-violet rays of sunlight.

6. In a bird feeder according to claim 4 wherein the molecular weight of said polymer is on the order of ten times the molecular weight of conventional high-density polyethylene resins.

7. In a bird feeder according to claim 1, wherein said side walls are made of wood, and wherein said ledges are secured to the side walls.

8. In a bird feeder according to claim 7, wherein said ledges are secured to the lower inner vertical surfaces of said side walls.

9. In a bird feeder according to claim 7, wherein said ledges are secured to the undersides of said side walls and extend horizontally inwardly of said inner surfaces.

10. In a bird feeder according to claim 1, wherein said side walls and ledges are integral and are both made of said plastic material.

11. In an outdoor bird feeder having rectangular upstanding side and end walls defining a trough for containing bird seed between inner vertical surfaces of said walls, a relatively rigid, thin flat metallic perforate bottom screen having a plurality of spaced openings of dimensions less than the seed to be contained therein but enabling liquid drainage through said openings, narrow screen-supporting ledges located in horizontal grooves adjacent the bottom of said side wall inner surfaces for providing sole support for said screen when positioned on the ledges to form the bottom of said trough, said metallic screen having opposed lower underside edges thereof being directly supported atop and in surface contact with said ledges, said screen further being removable solely in its plane relative to said trough by sliding on said ledges for enabling cleaning of seed residue and bird droppings therefrom, said ledges consisting of water-impervious polymeric plastic material having a self-lubricating characteristic tending to cause water droplets to bead rather than sheet thereon when wet, said self-lubricating characteristic resisting the tendency of ice to adhere to said ledges and soil to cake thereon whereby the screen may be readily and relatively easily removed in its plane from the trough when ice and/or soil exists between the underside edges of said screen and upper edges of said ledges at temperatures below that at which water freezes;

wherein at least one end wall that extends across said side walls at a right angle thereto has an open area from its bottom inner edge to a level above said ledges slightly exceeding the thickness of said screen, whereby said screen may extend into and be removed horizontally from said open area along the upper surfaces of said ledges; and wherein a second end wall remote from said at least one end wall has a notched underside that extends across said side walls and is relieved upwardly above said ledges a distance slightly exceeding the screen thickness, whereby, when said screen is fully inserted into said feeder, that edge of the screen adjacent the notched underside extends at least partially beneath the inner vertical surface of said remote end wall.

12. In an outdoor bird feeder having rectangular upstanding moisture-absorbing wooden side and end walls defining a trough for containing bird seed between inner vertical surfaces of said walls, a relatively rectangular rigid, thin flat metallic perforate bottom screen having a plurality of spaced openings of dimensions less than the seed to be contained therein but enabling liquid drainage through said openings, narrow screen-supporting ledges spaced apart a distance less than one dimension of said screen and being located adjacent the bottom of at least said side wall inner surfaces for providing support for said screen when positioned on the ledges to form the bottom of said trough, said metallic screen having opposed lower underside edges thereof being directly supported atop and in surface contact with said ledges but being free of contact with said wooden side and end walls, said screen further being removable solely in its plane relative to said trough by sliding on said ledges for enabling cleaning of seed residue and bird droppings therefrom, said ledges consisting of water-impervious polymeric plastic material having a self-lubricating characteristic tending to cause water droplets to bead rather than sheet thereon when wet, said self-lubricating characteristic resisting the tendency of ice to adhere to said ledges and soil to cake thereon whereby the screen may be readily and relatively easily removed in its plane from the trough when ice and/or soil exists between the underside edges of said screen and upper surfaces of said ledges at temperatures below that at which water freezes, and, wherein at least one end wall that extends across said side walls at a right angle thereto has an open area from its bottom inner edge to a level above said ledges slightly exceeding the thickness of said screen, whereby said screen may extend into and be removed horizontally from said open area along the upper surfaces of said ledges.

13. In a bird feeder according to claim 12, wherein said side walls are provided with horizontal grooves therein, and wherein said ledges are fixedly supported in said grooves and project inwardly of said side walls.

14. In a bird feeder according to claim 12, wherein said at least one end wall that extends across said side walls has an underside surface of the same plastic material as said ledges, said underside surface and the top surface of said screen being vertically spaced apart a nominal distance allowing free sliding motion of said screen during its removal and reinstallation.

15. In a bird feeder according to claim 12 wherein said ledges comprise a polymer consisting of an ultra high molecular weight polyethylene.

16. In a bird feeder according to claim 15 wherein said ledge material is further provided with a characteristic rendering it resistant to ultra-violet rays of sunlight.

* * * * *